United States Patent
Eim et al.

(10) Patent No.: US 10,284,940 B2
(45) Date of Patent: May 7, 2019

(54) EARSET AND CONTROL METHOD THEREFOR

(71) Applicant: LG ELECTRONICS INC., Seoul (KR)

(72) Inventors: Sanghyun Eim, Seoul (KR); Younhwa Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,105

(22) PCT Filed: Jul. 24, 2015

(86) PCT No.: PCT/KR2015/007759
§ 371 (c)(1),
(2) Date: Jan. 23, 2018

(87) PCT Pub. No.: WO2017/018552
PCT Pub. Date: Feb. 2, 2017

(65) Prior Publication Data
US 2018/0220220 A1     Aug. 2, 2018

(51) Int. Cl.
*H04R 1/10*     (2006.01)
*H04R 3/00*     (2006.01)
(Continued)

(52) U.S. Cl.
CPC ............ *H04R 1/1041* (2013.01); *H04M 1/05* (2013.01); *H04M 1/6041* (2013.01);
(Continued)

(58) Field of Classification Search
CPC .... H04R 1/1041; H04R 1/1016; H04R 1/105; H04R 2420/03; H04R 2420/05;
(Continued)

(56) References Cited

U.S. PATENT DOCUMENTS

2012/0230509 A1*  9/2012  Hagglund ............ H04R 1/1041
                                                               381/74
2012/0281850 A1*  11/2012 Hyatt .................. H04R 1/1041
                                                               381/74
(Continued)

FOREIGN PATENT DOCUMENTS

KR     200262768     3/2002
KR     200316856     6/2003
(Continued)

OTHER PUBLICATIONS

PCT International Application No. PCT/KR2015/007759, International Search Report dated Apr. 22, 2016, 2 pages.

*Primary Examiner* — Thang V Tran
(74) *Attorney, Agent, or Firm* — Lee, Hong, Degerman, Kang & Waimey

(57) ABSTRACT

The present disclosure relates to an earset and a control method therefor, the earset comprising: an earset main body including two ends which are configured to be detachable from and attachable to each other; a plurality of earphones for outputting sound signals; a sound output part including at least one speaker; a sensing part for sensing a change in detachment and attachment states of the two ends; and a control part which, depending on whether the detachment and attachment states of the two ends are changed, turns on or off a function which is executed in the earset or executes any one of the functions corresponding to an event sensed from the earset.

16 Claims, 12 Drawing Sheets

(51) Int. Cl.
*H04M 1/05* (2006.01)
*H04M 1/60* (2006.01)
*H04W 76/10* (2018.01)

(52) U.S. Cl.
CPC ........ *H04M 1/6066* (2013.01); *H04R 1/1016* (2013.01); *H04M 1/6058* (2013.01); *H04R 1/105* (2013.01); *H04R 3/005* (2013.01); *H04R 2201/107* (2013.01); *H04R 2410/05* (2013.01); *H04R 2420/07* (2013.01); *H04W 76/10* (2018.02)

(58) Field of Classification Search
CPC .......... H04R 2420/07; H04R 2201/107; H04R 3/00; H04R 3/005; H04R 3/12; H04M 1/05; H04M 1/6066; H04M 1/6058; H04M 1/6041; H04W 76/10
See application file for complete search history.

(56) References Cited

U.S. PATENT DOCUMENTS

| | | | | |
|---|---|---|---|---|
| 2014/0198929 | A1* | 7/2014 | Honeycutt | H04R 1/1041 381/74 |
| 2015/0195639 | A1* | 7/2015 | Azmi | H04R 1/1058 381/74 |
| 2015/0201271 | A1 | 7/2015 | Diethorn et al. | |
| 2017/0023971 | A1* | 1/2017 | Lee | H04R 1/1016 |

FOREIGN PATENT DOCUMENTS

| | | |
|---|---|---|
| KR | 1020130055650 | 5/2013 |
| KR | 101498087 | 3/2015 |

* cited by examiner

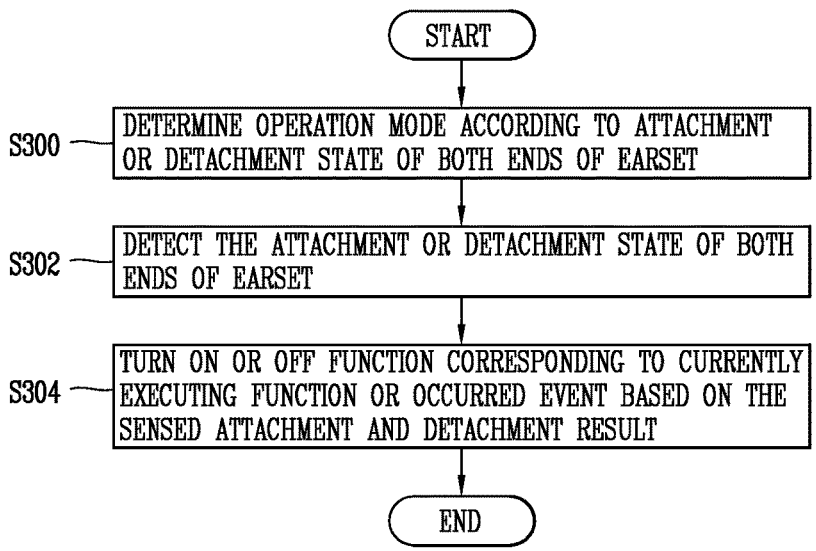
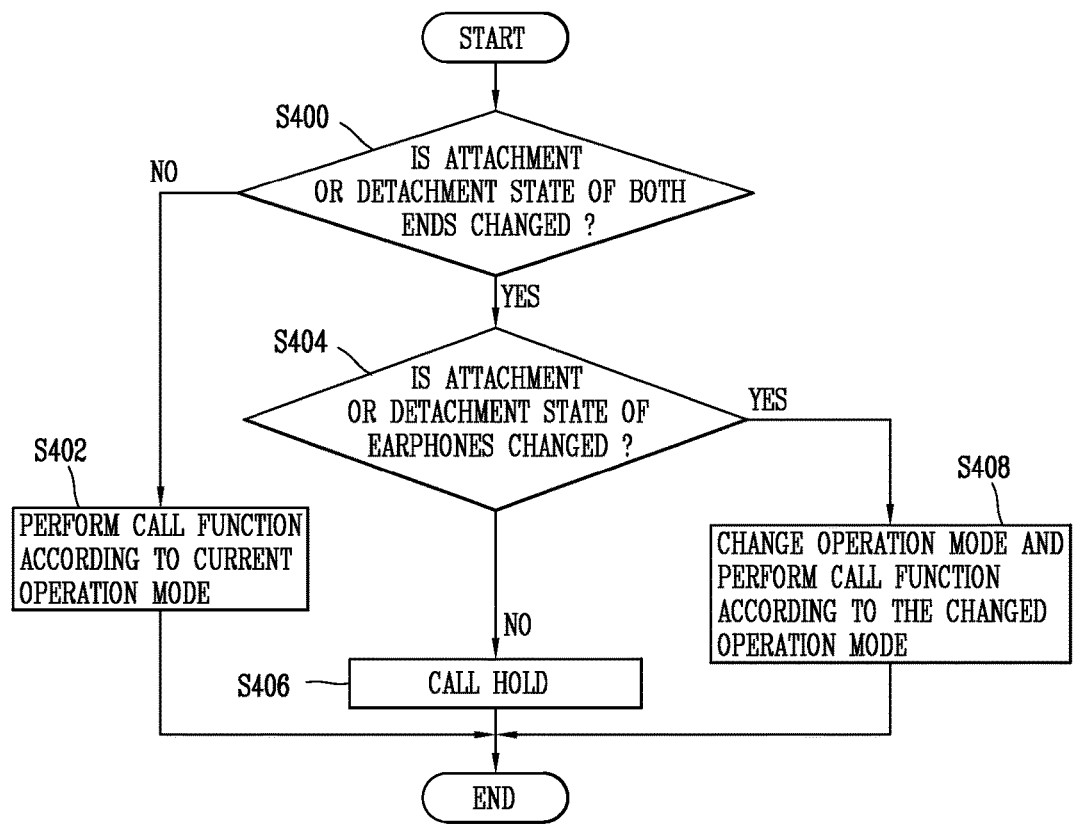

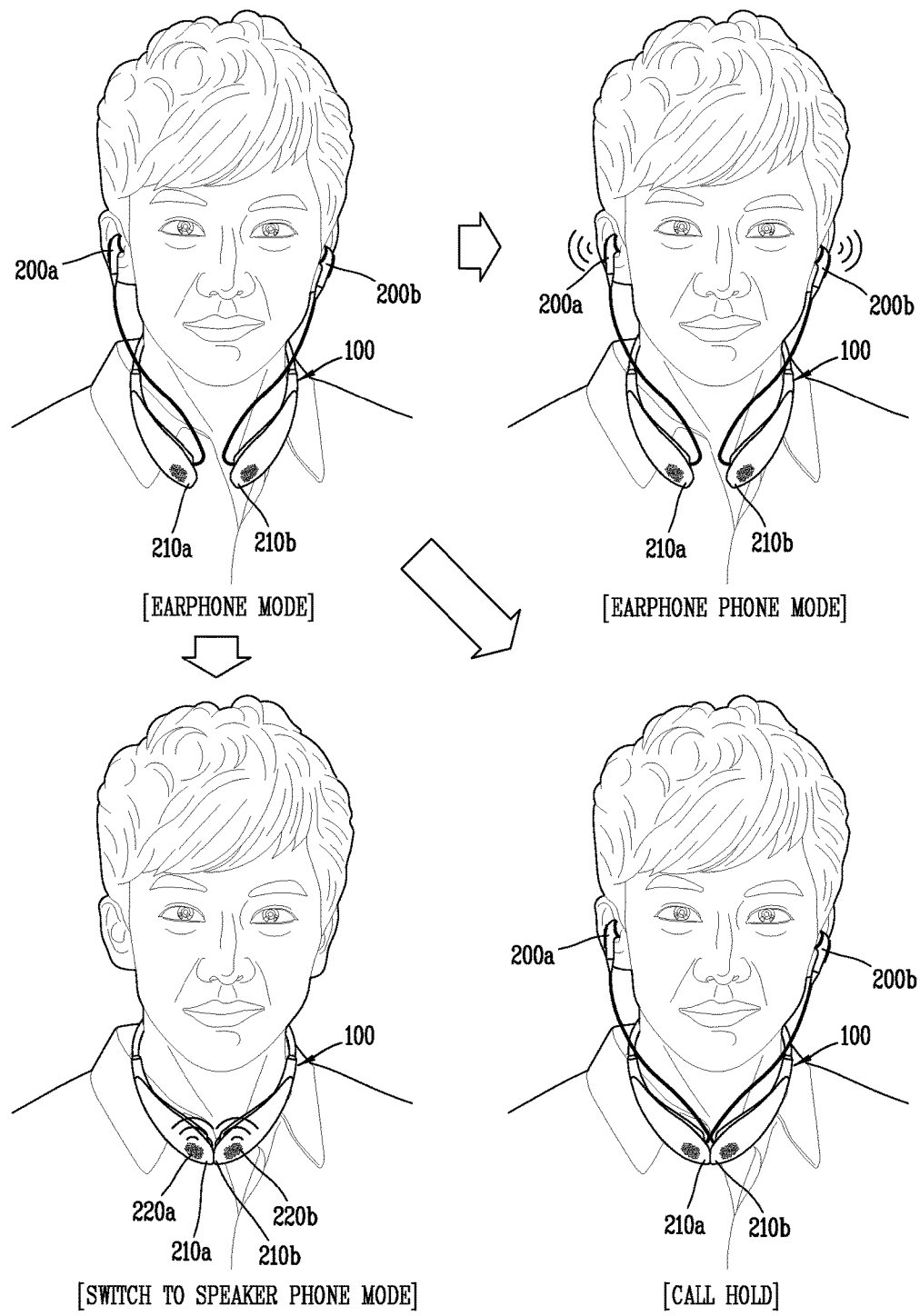

FIG. 7
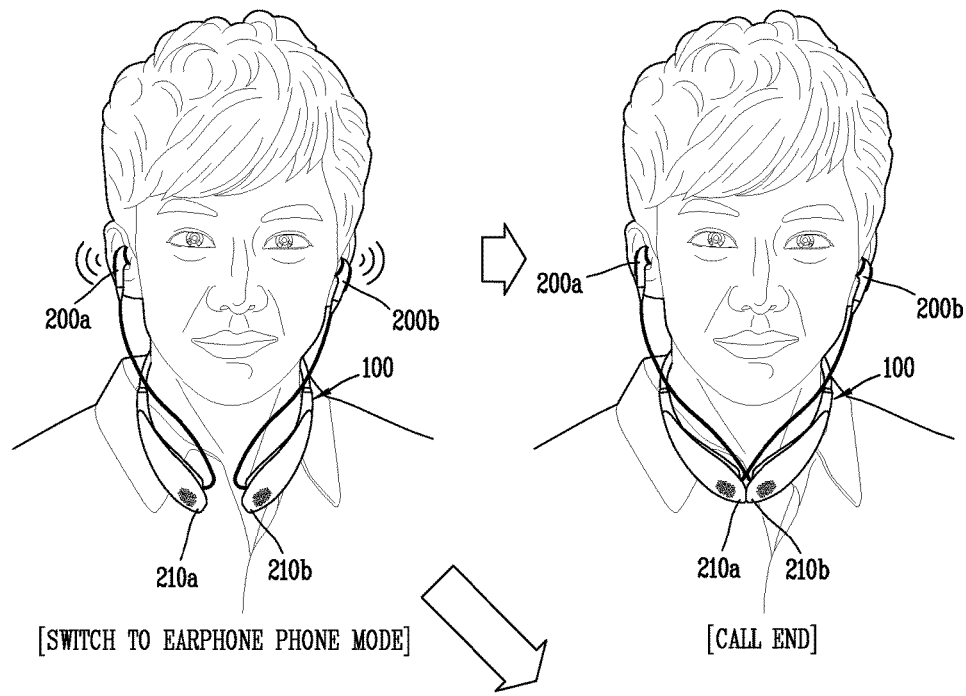
[SWITCH TO EARPHONE PHONE MODE]
[CALL END]
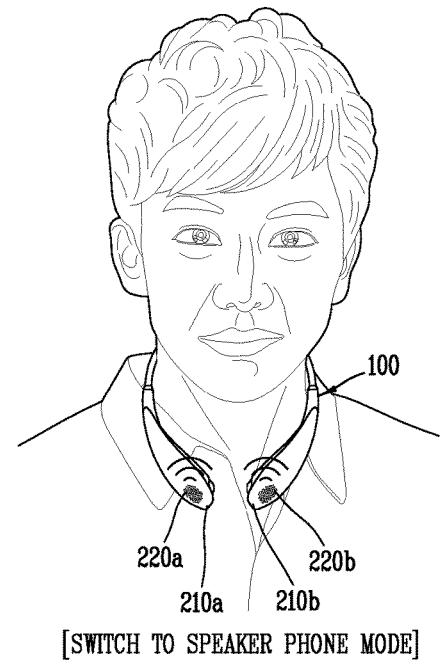
[SWITCH TO SPEAKER PHONE MODE]

FIG. 8
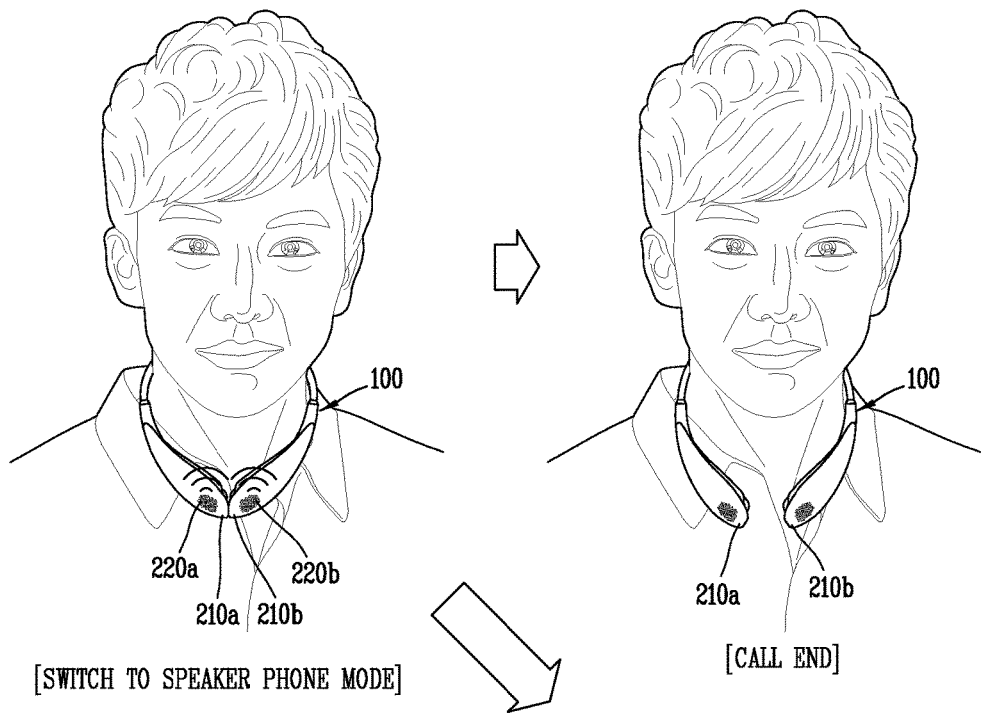
[SWITCH TO SPEAKER PHONE MODE]
[CALL END]
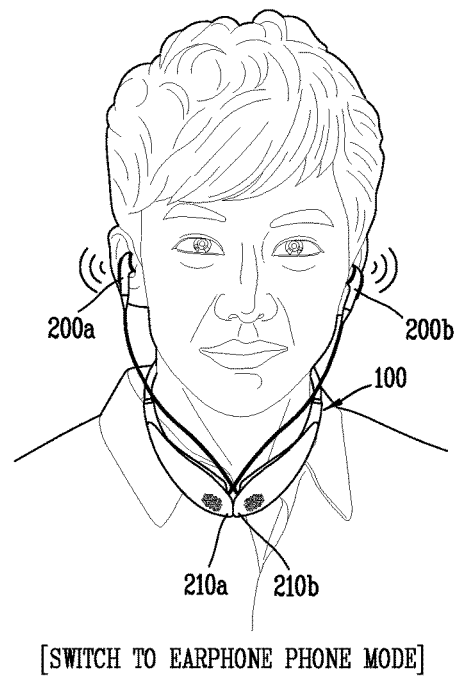
[SWITCH TO EARPHONE PHONE MODE]

FIG. 11A
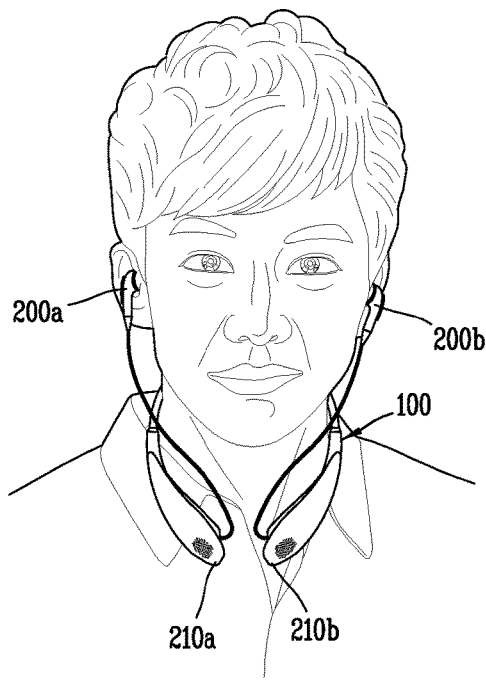
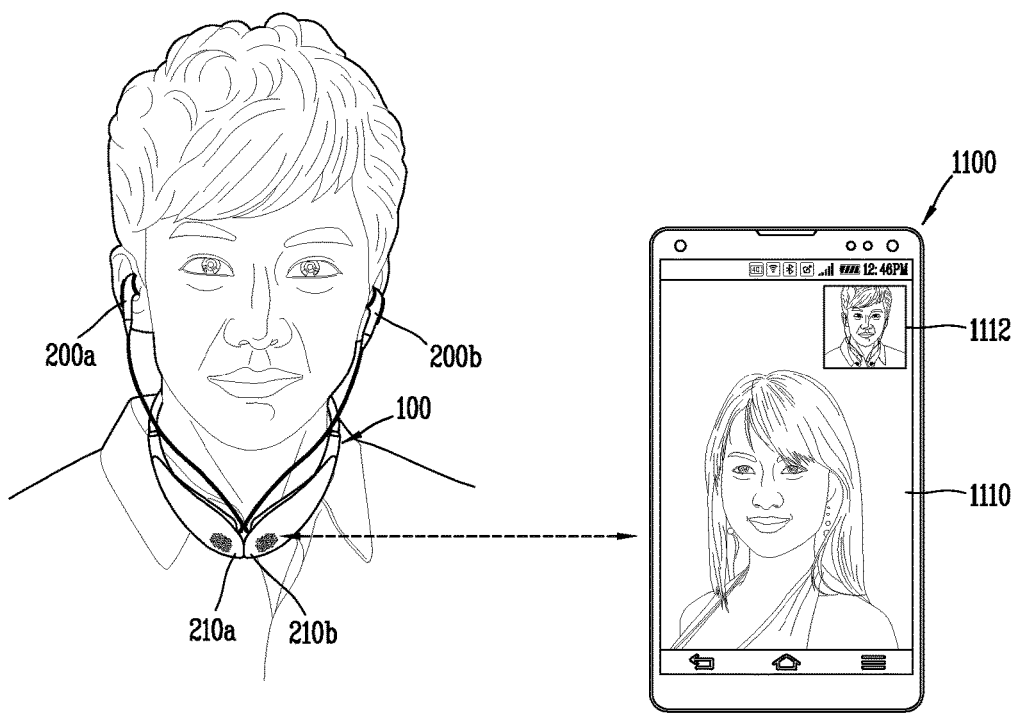

EARSET AND CONTROL METHOD THEREFOR

CROSS-REFERENCE TO RELATED APPLICATIONS

This application is the National Stage filing under 35 U.S.C. 371 of International Application No. PCT/KR2015/007759, filed on Jul. 24, 2015, the contents of which are hereby incorporated by reference herein in its entirety.

BACKGROUND OF THE INVENTION

1. Field of the Invention

The present disclosure relates to an earset and a control method thereof.

2. Description of the Related Art

In general, an earset denotes a device capable of outputting an audio signal in the form in which a microphone and an earphone are combined. Such an earset may be connected to a terminal such as a radio, an MP3 player or a smart phone in a wireless or wired manner. Furthermore, a signal received through the connected terminal may be output in the form of an audio signal, or a user's voice or ambient sound may be received and transmitted to the connected terminal.

In recent years, the functions of such an earset have been more diversified for the convenience of the user. For example, the earset may include a function of receiving broadcast data transmitted in a wireless manner by itself or a function of storing a plurality of sound source data to reproduce a sound source according to a user's selection without using an additional terminal, or output various audio signals. Alternatively, at least one key may be provided to transmit a control signal according to a user's input to the connected terminal, thereby allowing the user to use the function of the terminal in the earset without directly controlling the terminal.

On the other hand, as available functions provided in the earset have been more diversified and increased in number, studies on a method for allowing the user to select and use the available functions in the earset in a more convenient and simple manner have been actively carried out.

SUMMARY OF THE INVENTION

An object of the present disclosure is to solve the foregoing problems and other problems, and it is an object of the present disclosure to provide an earset for allowing a user to more easily and simply select and use a desired function, and a method of controlling the same.

Another object of the present disclosure is to provide an earset for allowing a user to select and use his or her desired function without having a plurality of keys, and a method of controlling the same.

In order to accomplish the foregoing or other objects, according to an aspect of the present disclosure, an earset according to an embodiment of the present disclosure may include an earset body including both ends formed to be detachable from or attachable to each other, an audio output unit including a plurality of earphones and at least one speaker for outputting an audio signal, a sensing unit configured to sense a change of an attachment or detachment state at both ends, and a controller configured execute the on/off of a function being executed in the earset or any one of functions corresponding to an event detected by the earset depending on whether or not the attachment or detachment state of the both ends is changed.

According to an embodiment, the earset may operate in either one of a first operation mode for outputting an audio signal through the plurality of earphones, and a second operation mode for outputting an audio signal through the speaker, and the controller may control the operation mode of the earset to operate in either one of the first operation mode and the second operation mode based on the attachment or detachment state of the both ends.

According to an embodiment, the sensing unit may further detect whether or not the earphones are attached or detached, and the controller may switch the operation mode of the earset to the other operation mode based on whether or not the attachment or detachment state of the both ends is changed and the detachment state of the earphones.

According to an embodiment, the earset may further include a wireless communication unit configured to receive a wireless signal, wherein when a call received through the wireless communication unit is sensed, the controller controls any one of functions related to the detected incoming call to be executed according to whether or not the attachment or detachment state of the both ends is changed, and the function related to the detected incoming call is one of a function of connecting a call according to the received call or a function of holding a call according to the received call.

According to an embodiment, when the call is on hold, the controller may transmit a guide message corresponding to call hold to the other party of the received call.

According to an embodiment, when the call is connected, the controller may output an audio signal received from the other party of the received call through the plurality of earphones or speakers according to a current operation mode of the earset, and control a function related to the connected call according to whether or not the attachment or detachment state of the both ends is changed, and the function related to the connected call may include a function of terminating the connected call.

According to an embodiment, the function related to the connected call may further include a function of changing an output path of an audio signal received from the other party of the received call, and the controller may change the output path based on whether or not the attachment or detachment state of the both ends is changed and whether the earphones are attached or detached.

According to an embodiment, when a sound source playback function is executed, the controller may output an audio signal according to the sound source playback through the plurality of earphones or speakers according to the attachment of detachment state of the both ends, and control a function related to the sound source playback according to whether or not the attachment or detachment state of the both ends is changed, and the function related to the sound source playback may include a function of temporarily suspending the sound source playback.

According to an embodiment, the function related to the sound source playback may further include a function of changing an output path of an audio signal according to the sound source playback, and the controller may change the output path based on whether or not the attachment and detachment state of the both ends is changed and whether the earphone are attached or detached.

According to an embodiment, a function related to the sound source playback may further include a function of fast forwarding and a function of rewinding the at least one music source, and the controller may control the fast forwarding or rewinding of at least one music source based on whether either one of the plurality of earphones is attached or detached.

According to an embodiment, the controller may detect a peripheral device connectable to the earset when the attachment or detachment state of the both ends is changed, and control a function associated with the connectable peripheral device to be executed in the earset and the peripheral device according to the detection result.

According to an embodiment, the peripheral device may be in an operating state related to a function being executed in the earset when the attachment or detachment state of the both ends is changed among devices connectable with the earset.

According to an embodiment, the peripheral device may be a device including a video input/output device, and when the attachment or detachment state of the both ends is changed during an operation state in which the earset performs a call function, the controller may output a video signal received from the other party of the call through the peripheral device, and transmit a user's video received through the peripheral device to the other party of the call.

According to an embodiment, the peripheral device may be a device including a video output device, and when the attachment or detachment state of the both ends is changed during an operation state in which the earset performs a function of playing back a sound source, the controller may output video information related to a sound source played back in the earset through the peripheral device.

According to an embodiment, the earset may further include an optical output unit that emits light of various light sources according to whether or not a preset condition is satisfied, and the controller may control the optical output unit to be turned on or off according to whether the state of the both ends is changed or not.

According to an embodiment, the controller may control the light emission of the optical output unit according to whether or not the earset is connected to a preset peripheral device, and the preset peripheral device may include a preset cradle.

In order to accomplish the foregoing and other objects, according to an aspect of the present disclosure, there is provided a control method of an earset comprising both ends formed to be detachable from or attachable to each other, and the method may include operating in a first operation mode for outputting an audio signal through the plurality of earphones, and a second operation mode for outputting an audio signal through the speaker according to the attachment or detachment state of the both ends, detecting whether the attachment or detachment state of the both ends is changed, and executing the on/off of a function being executed in the earset or any one of functions corresponding to an event detected by the earset or switching the operation mode of the earset.

The effects of an earset according to the present disclosure and a control method thereof will be described as follows.

According to at least one of the embodiments of the present disclosure, the present disclosure may allow a user to select and control a desired function without using any one of a plurality of keys or a combination of the keys, thereby allowing the user to use an earset in a more easy and convenient manner.

Furthermore, according to at least one of the embodiments of the present disclosure, the present disclosure may execute a specific function or control a function being executed according to a detection result using a magnetic sensor, thereby reducing a number of keys provided in the earset.

In addition, according to at least one of the embodiments of the present disclosure, the earset may be further provided with a lighting function, thereby further securing the safety of the user and providing more various functions using the lighting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart illustrating an operation flow of an earset associated with the present disclosure;

FIG. 4 is a flowchart illustrating an operation flow when a call is received at an earset associated with the present disclosure;

FIG. 5 is an exemplary view illustrating an example in which a call is received when an earset associated with the present disclosure is in an earphone mode;

FIG. 7 is an exemplary view illustrating an example of performing a call function when an earset associated with the present disclosure is in an earphone phone mode;

FIG. 8 is an exemplary view illustrating an example of performing a call function when an earset associated with the present disclosure is in a speaker phone mode;

FIGS. 11A and 11B are exemplary views illustrating examples in which an earset associated with the present disclosure operates in connection with a peripheral device.

DETAILED DESCRIPTION OF THE INVENTION

Figure 1:
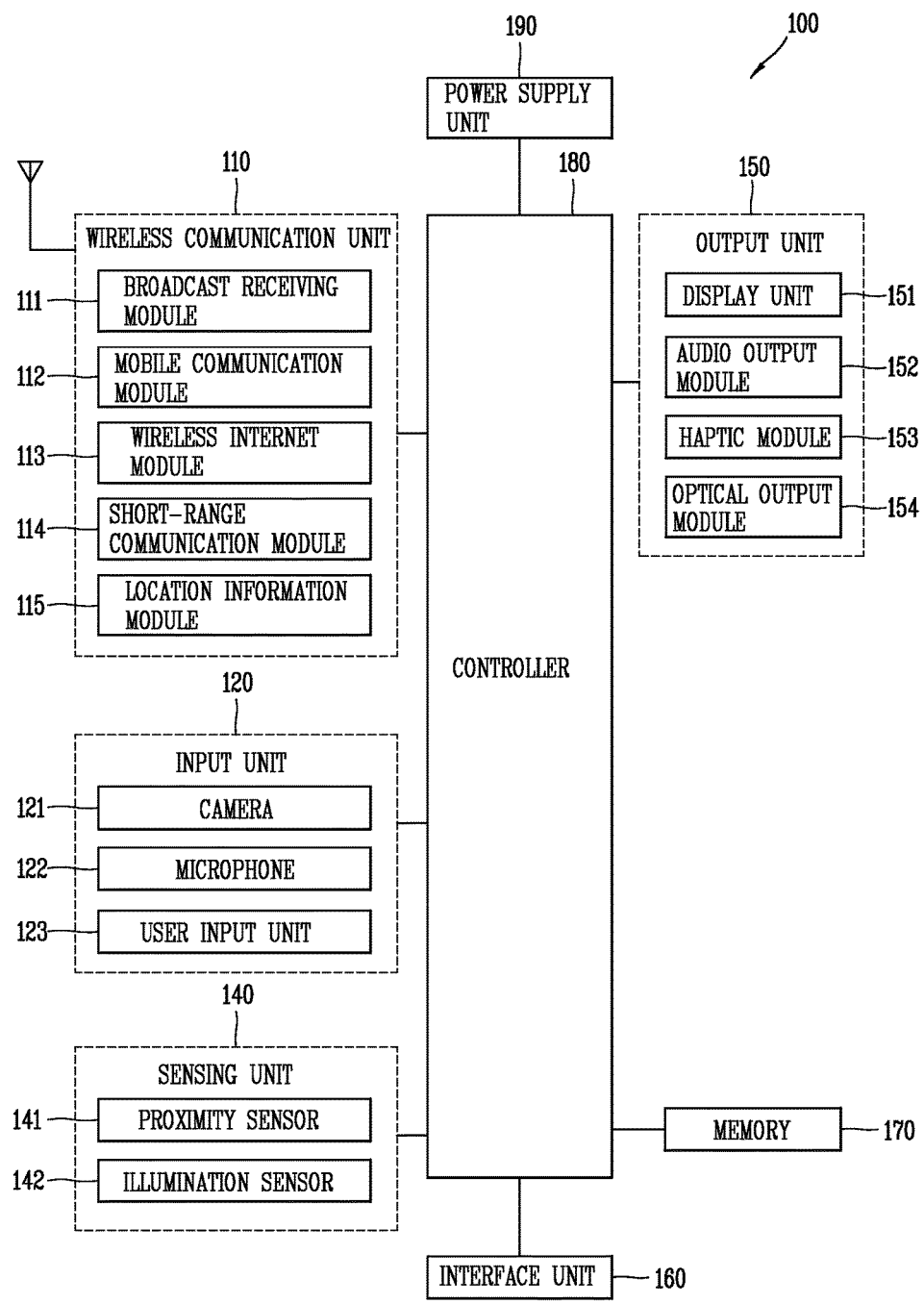
FIG. 1 is a block diagram for explaining an earset associated with the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

Accordingly, it would be easily understood by those skilled in the art that a configuration according to the embodiments of this specification may be applicable to a stationary terminal such as a digital TV, a desktop computer, a digital signage or the like, excluding a case particularly configured only for an earset.

First, FIG. 1 is a block diagram for explaining an earset 100 associated with the present disclosure.

The earset 100 may include a wireless communication unit 110, an input unit 120, a sensing unit 140, an output unit 150, an interface unit 160, a memory 170, a controller 180, a power supply unit 190, and the like. The components illustrated in FIG. 1 may not be necessarily required, and the earset 100 described in the present disclosure may have a greater or less number of components than those components illustrated in the above.

More specifically, the wireless communication unit 110 of those components may typically include one or more modules which permit wireless communications between the earset 100 and a wireless communication system, between the earset 100 and another earset 100, or between the earset 100 and an external server. In addition, the wireless communication unit 110 may include one or more modules for connecting the earset 100 to one or more networks.

The wireless communication unit 110 may include at least one of a broadcast receiving module 111, a mobile communication module 112, and a short-range communication module 113.

The input unit 120 may include a microphone 122 or an audio input unit for receiving an audio signal, and a user input unit 123 (for example, a touch key, a push key (or a mechanical key), etc.) for receiving information from the user. Audio data or image data collected by the input unit 120 may be analyzed and processed by a user's control command.

The sensing unit 140 may include at least one sensor for sensing at least one of information within the earset 100, surrounding environmental information of the earset 100, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, a RGB sensor, an infrared sensor (IR sensor), a finger scan sensor, an ultrasonic sensor, an optical sensor, a microphone, a battery gauge, an environmental sensor (for example, a barometer, a hygrometer, a thermometer, a radiation sensor, a heat sensor, a gas sensor, etc.), a chemical sensor (e.g., an electronic nose, a healthcare sensor, a biometric sensor, etc.). On the other hand, the earset disclosed herein may utilize information in such a manner of combining information sensed by at least two sensors of those sensors.

The output unit 150 may be configured to output an audio signal, a video signal or a tactile signal. The output unit 150 may include an audio output unit 151, a haptic module 152, an optical output unit 153 and the like.

The interface unit 160 serves as an interface with various types of external devices connected to the earset 100. The interface unit 160 may include an external charger port, a wired/wireless data port, a memory card port, a port for connecting a device having an identification module, an audio input/output (I/O) port, and a video input/output (I/O) port. The earset 100 may execute an appropriate control related to a connected external device, in response to the external device being connected to the interface unit 160.

In addition, the memory 170 stores data supporting various functions of the earset 100. The memory 170 may store a plurality of application programs or applications executed in the earset 100, data or instructions for the operations of the earset 100, and the like. At least some of those application programs may be downloaded from an external server via wireless communication. Furthermore, some of those application programs may exist on the earset 100 at the time of being shipped for basic functions of the earset 100 (for example, a playback function of sound source data, etc.). On the other hand, the application programs may be stored in the memory 170, installed in the earset 100, and executed by the controller 180 to perform an operation (or a function) of the earset 100.

The controller 180 may typically control an overall operation of the earset 100 in addition to the operations related to the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the earset 100 for operation.

The power supply unit 190 may receive external power or internal power and supply appropriate power required for operating respective elements and components included in the earset 100 under the control of the controller 180. The power supply unit 190 may include a battery, and the battery may be an embedded battery or a replaceable battery.

At least part of those components may be combined to implement operation and control of the earset or a control method of the earset according to various exemplary embodiments described herein. Furthermore, the operation, control or control method of the earset may be implemented on the earset by the execution of at least one application program stored in the memory 170.

Hereinafter, the foregoing components will be described in more detail with reference to FIG. 1, prior to explaining various exemplary embodiments implemented through the foregoing earset 100.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the earset 100 to simultaneously receive at least two broadcast channels or switch the broadcast channels. Such a broadcast channel may include a radio channel or a music broadcast channel.

The mobile communication module 112 may transmit and receive a wireless signal to and from at least one of a base station, an external terminal, and a server on a mobile communication network established according to technical standards or communication methods for mobile communications (for example, Global System for Mobile communication (GSM), Code Division Multi Access (CDMA), Long Term Evolution (LTE), Long Term Evolution-Advanced (LTE-A), and the like).

The wireless signals may include audio call signal, video (telephony) call signal, or various formats of data according to transmission/reception of text/multimedia messages.

The short-range communication module 113 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB), and the like. The short-range communication module 113 may support wireless communications between the earset 100 and a wireless communication system, between the earset 100 and another mobile terminal 100, or between the earset 100 and a network where another mobile terminal 100 (or an external server) is located, via wireless personal area networks. The short-range wireless communication network may be a short-range wireless personal area network.

Here, the mobile terminal may be a wearable device (for example, a smart watch, smart glasses or a head mounted display (HMD)) capable of exchanging (linking) data with the earset 100 according to the present disclosure. The short-range communication module 113 may sense (recognize) a wearable device capable of communicating with the earset 100 in the vicinity of the earset 100. In addition, when the sensed wearable device is a device which is authenticated to communicate with the earset 100 according to the present disclosure, the controller 180 may transmit at least part of data processed in the earset 100 to the wearable device via the short-range communication module 113. Hence a user of the wearable device may use data processed in the earset 100 through the wearable device. For example, according to this, the user may perform a phone conversation through the wearable device when a call is received at the earset 100.

Next, the input unit 120 is configured to receive audio information (or signal), data, or information input from a user, and the input unit 120 may include a microphone 122 or a user input unit 123. The microphone 122 may process an external audio signal into electric audio data. The processed audio data may be used in various ways according to a function being executed in the earset 100 (or an application program being executed). On the other hand, the microphone 122 may include assorted noise removing algorithms to remove noise generated in the course of receiving the external audio signal.

The user input unit 123 may receive information input by a user. When information is received through the user input unit 123, the controller 180 may control an operation of the earset 100 to correspond to the input information. The user input unit 123 may include a mechanical input element (or a mechanical key, for example, a button, a dome switch, a jog wheel, a jog switch or the like located on a front/rear surface or a side surface of the earset 100), and a touch-sensitive input element. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 senses at least one of information within the earset 100, surrounding environmental information of the earset 100, and user information, and generates a sensing signal corresponding thereto. The controller 180 may control the operation of the earset 100 or execute data processing, a function or an operation related to an application program installed in the earset 100 based on the sensing signal.

The sensing unit 140 may include a proximity sensor 141 and an illumination sensor 142, and the proximity sensor 141 denotes a sensor for detecting the presence or absence of an object approaching a predetermined sensing surface or an object in the vicinity of the sensing surface without any mechanical contact using a force of an electromagnetic field or infrared rays, or the like, and the illuminance sensor 142 denotes a sensor for detecting an amount of light around the earset 100.

On the other hand, the sensing unit 140 may further include a plurality of magnetic sensors 143. The plurality of magnetic sensors 143 may be provided on at least two points on an outer surface forming the earset 100. Furthermore, the plurality of magnetic sensors 143 may be formed in such a manner that at least two of them can be attached to or detached from each other. In addition, the plurality of magnetic sensors 143 may sense at least part thereof when they are attached to each other or detached from each other in a state of being attached. Then, the controller 180 may determine a function to be executed in the earset 100 or control a function currently being executed based on the attachment and detachment detection result of the magnetic sensors 143.

For example, when the occurrence of a specific event is detected in the earset 100, the controller 180 may perform a function corresponding to the occurred event based on the detection result of the magnetic sensors 143. Alternatively, the controller 180 may control at least one of functions currently executed by the earset 100 based on the detection result of the magnetic sensors.

Alternatively, the controller 180 may determine the operation mode of the earset 100 based on the detection result of the magnetic sensors 143. For example, when the earset 100 includes not only an earphone but also a speaker, and there are two or more paths for outputting audio information (earphone or speaker), the controller 180 may control the earset 100 in an operation mode in which an audio signal is output through the earphone (hereinafter, referred to as an earphone operation mode) or an operation mode in which an audio signal is output through the speaker (hereinafter, referred to as a speaker operation mode) based on the detection result of the magnetic sensors 143.

On the other hand, the output unit 150 may include an audio output unit 151 for outputting an audio signal, a haptic module 152 for outputting a tactile signal that can be detected by the user when an event such as an incoming call or low battery warning occurs, and an optical output unit 153 capable of outputting various optical signals.

The audio output module 151 may output audio data received from the wireless communication unit 110 or stored in the memory 170 in a call signal reception mode, a call mode or recording mode, a voice recognition mode, a broadcast reception mode, and the like. The audio output unit 151 may also output an audio signal associated with a function (e.g., a call signal reception sound, a message reception sound, etc.) performed by the earset 100. The audio output unit 151 may include a receiver, a speaker, a buzzer, an earphone, and the like.

The haptic module 152 may generate various tactile effects that can be felt by the user. A representative example of a tactile effect generated by the haptic module 152 may be vibration. The intensity, pattern and the like of the vibration generated by the haptic module 152 may be controlled by a user's selection or setting of the controller 180. For example, the haptic module 152 may output different vibrations in a combining manner or a sequential manner.

The optical output unit 153 outputs an optical signal using light emitted from various light sources. For example, the optical output unit 153 may output an optical signal for notifying occurrence of an event. Here, examples of the generated event may include a message reception, a call signal reception, a missed call, an alarm, a schedule notice, an email reception, information reception through an application, and the like.

The optical signal output by the optical output unit 153 is implemented as a light-emitting diode (LED) provided in the earset 100 emits light of a single color or a plurality of colors. Furthermore, the output of the optical signal may be terminated by the earset detecting the user's event confirmation.

Meanwhile, the optical output unit 153 may emit light of a single color or a plurality of light according to the control of the controller 180 as well as the occurrence of an event. In other words, the controller 180 may cause the optical output unit 153 to emit a single color or a plurality of lights according to the user's selection. The controller 180 may distinguish between operating in a state where light is emitted from the optical output unit 153 and operating in a state where light is not emitted, as different operation modes, and allow the earset 100 to operate in any one operation mode according to the user's selection. Furthermore, here, the user's selection may of course indicate whether the magnetic sensor 143 is detached or not.

On the other hand, the interface unit 160 serves as an interface for all external devices connected to the earset 100. The interface unit 160 may receive data from an external device, receive power to transfer it to each component within the earset 100, or transmit data within the earset 100 to an external device. The interface unit 160 may include a wired/wireless headset port, an external charger port, a wired/wireless data port, a memory card port, a port for connecting a device having an identification module, an audio input/output (I/O) port, a video input/output (I/O) ports, and the like.

On the other hand, the identification module may be configured as a chip for storing various information required to authenticate an authority to use the earset 100, which may include a User Identity Module (UIM), a Subscriber Identity Module (SIM), and the like. In addition, the device having the identification module (hereinafter, referred to as an "identification device") may manufactured in the form of a smart card. Accordingly, the identification device may be connected to the earset 100 via the interface unit 160.

Furthermore, the interface unit 160 may serve as a path for power to be supplied from an external cradle to the earset 100 when the earset 100 is connected to the external cradle or as a path for transferring various command signals inputted from the cradle by a user to the earset 100. Such various command signals or power inputted from the cradle may operate as signals for recognizing that the earset 100 has accurately been mounted to the cradle.

The memory 170 may store programs the operation of the controller 180, and store input/output data or data for various sound sources. The memory 170 may store data on vibration and optical signals of various patterns that can be output from the haptic module 152 or the optical output unit 153.

On the other hand, as described above, the controller 180 may control an operation associated with application programs, and typically the overall operations of the earset 100. For example, the controller 180 may control various functions of the earset 100 based on values sensed by the sensing unit 140. For example, the controller 180 may determine the operation mode of the earset 100 to be an earphone mode or a speaker mode based on the sensed values of the plurality of magnetic sensors 143. Alternatively, the controller 180 may allow the operation mode of the earset 100 to operate in a lighting mode in which light of a predetermined brightness is emitted from the optical output unit 153 or a typical operation mode (normal mode) in which no light is emitted.

In addition, when a specific event is detected, the controller 180 may perform any one of a plurality of functions corresponding to the relevant event based on the detection value. Alternatively, the controller 180 may control a function currently performed on the earset 100 based on the detection value of the magnetic sensor 143 when a specific function is being carried out in the earset 100.

On the other hand, the power supply unit 190 may receive external power or internal power and supply power required for the operation of the respective components under the control of the controller 180. The power supply unit 190 may include a battery, which is typically rechargeable or be detachably coupled to the earset body for charging. Furthermore, the power supply unit 190 may include a connection port. The connection port may be configured as one example of the interface unit 160 to which an external (re)charger for supplying power to recharge the battery is electrically connected.

For another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Hereinafter, the structure of the earset 100 according to an embodiment of the present disclosure that has been described above in FIG. 1 will be described with reference to FIG. 2.

Figure 2:
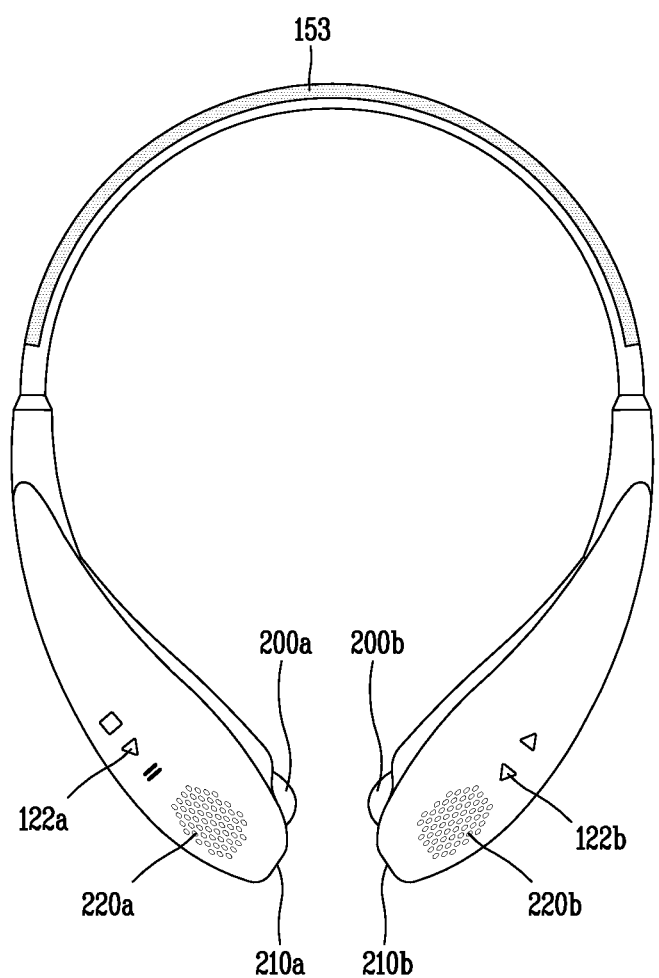
FIG. 2 is an exemplary view illustrating an example of an earset associated with the present disclosure.

Referring to FIG. 2, the disclosed earset 100 includes a fixed type body formed in a form that the user can put on like a necklace. However, the present disclosure is not limited thereto, and may be applicable to various structures such as a form in which two or more bodies are connected in a line shape whose shape is not fixed.

Here, the earset body may be understood as a conception which indicates the earset 100 as at least one assembly.

The earset 100 may include a case (for example, a frame, a housing, a cover, etc.) constituting the appearance thereof. The cases may be formed by injection-molding a synthetic resin or may be also formed of a metal, for example, stainless steel (STS), aluminum (Al), titanium (Ti), or the like. On the other hand, the earset 100 may include a waterproof portion (not shown) for preventing water from infiltrating into the earset body. For example, the waterproof portion may include a waterproof member that seals an inner space of the case.

On the other hand, the earset 100 may have a plurality of paths through which audio signals are output as the audio output unit 151. For example, the earset 100 according to an embodiment of the present disclosure may include two speakers 220*a*, 220*b* as well as earphones 200*a*, 200*b*, and may output audio signals through the earphones 200*a*, 200*b* (earphone mode), and output audio signals through the speakers 220*a*, 220*b* (speaker mode). Here, the earphones 200*a*, 200*b* may be implemented in a shape that can be mounted on a groove inside the case, and according to circumstances, may be formed in a shape in which a user can take out the earphones 200*a*, 200*b* from the groove of the case of the earset 100.

Meanwhile, at least one magnetic sensor 143 may be provided at both ends 210*a*, 210*b* of the earset 100, respectively. In this case, the both ends 210*a*, 210*b* of the earset 100 may be attached to each other by a magnetic force of the magnetic sensor 143 when they approach each other within a predetermined distance, and remain attached until they are detached by the user and separated by more than a predetermined distance.

Meanwhile, the case of the earset 100 may include first and second manipulation units 122*a*, 122*b*, an illumination sensor 142, a microphone 121, an interface unit 160, and the like. The first and second manipulation units 122*a*, 122*b* may also employ a method of allowing the user to perform manipulation without a tactile feeling through a proximity touch, a hovering touch, or the like.

The drawings are illustrated on the basis that the first manipulation unit 123*a* is a touch key, but the present disclosure may not be necessarily limited to this. For example, the first manipulation unit 123*a* may be configured with a mechanical key, or a combination of a touch key and a push key.

The content received by the first and second manipulation units 123*a* and 123*b* may be set in various ways. For example, the first manipulation unit 122*a* may receive a command such as menu, home key, cancel, search, or the like, and the second manipulation unit 122*b* may receive a command such as audio volume control output from the earphones 220*a*, 220*b* or the speakers 220*a*, 220*b*.

In addition, in the earset 100 according to an embodiment of the present disclosure, the optical output unit 153 may be formed as illustrated in FIG. 2. In other words, when the user wears the earset 100 according to an embodiment of the present disclosure, the optical output unit 153 may be formed at a rear portion of the earset 100 to allow light emitted from the optical output unit 153 to be more clearly identified from behind the user. In this case, the light of the optical output unit 153 may be emitted from behind the user to allow a vehicle or person behind the user to more easily identify the user, thereby further reducing the risk of an accident.

Hereinafter, the earset 100 implemented as illustrated in FIG. 2 will be described as an example. However, it is needless to say that the present disclosure is not limited to the earset 100 as illustrated in FIG. 2, and it is needless to say that the present disclosure can also be applied to earphones implemented in various forms. In other words, in the earset 100 illustrated in FIG. 2, an example in which at least one magnetic sensor 143 is provided at each of the both ends 210*a*, 210*b*, and whether the both ends 210*a*, 210*b* are detached or not can be sensed by the magnetic sensors 143 has been described, but the magnetic sensor 143 may also be formed at a position other than the both ends 210*a*, 210*b*.

Hereinafter, embodiments associated with a control method which can be implemented in the earset 100 having the foregoing configuration will be described with reference to the attached drawings. It should be understood by those skilled in the art that the present disclosure can be embodied in other specific forms without departing from the concept and essential characteristics thereof.

First, FIG. 3 is a flow chart illustrating an operation flow of an earset associated with the present disclosure.

Referring to FIG. 3, the controller 180 of the earset 100 according to an embodiment of the present disclosure may determine the operation mode of the earset 100 according to an attachment or detachment state of both ends 210*a*, 210*b* of the earset 100 (S300). For example, when the both ends 210*a*, 210*b* are attached to each other as a result of the detection in step S300, the controller 180 may allow the operation mode of the earset 100 to operate in a "speaker mode" for outputting audio signals through the speakers 220*a*, 220*b*. However, if the both ends 210*a*, 210*b* are not attached to each other, the controller 180 may allow the operation mode of the earset 100 to operate in an "earphone mode" for outputting audio signals through the earphones 200*a*, 200*b*. In other words, the earset 100 according to an embodiment of the present disclosure may output audio signals to the earphones 200*a*, 200*b* or the speakers 220*a*, 220*b* according to whether the both ends 210*a*, 210*b* are detached or not, and accordingly, the controller 180 may select whether or not to operate in an earphone mode or speaker mode from the user through the attachment or detachment of the both ends 210*a*, 210*b* of the earset 100

On the other hand, when the operation mode of the earset 100 is determined in the step S300, the controller 180 may detect the attachment or detachment state of the both ends 210*a*, 210*b* (step S302). Furthermore, the controller 180 may control the on or off of a function corresponding to a function or an event currently being executed in the earset 100 based on the attachment or detachment state of the both ends 210*a*, 210*b*.

For example, when the occurrence of a specific event is sensed, the controller 180 may execute one of functions corresponding to the occurred event according to the state of the both ends 210*a*, 210*b*. In other words, when an event such as an incoming call is detected, the controller 180 may allow the call to be put on hold based on the state of the both ends 210*a*, 210*b*, or output a voice signal according to the incoming call based on an operation mode different from the current operation mode of the earset 100. A flow of an operation process in which a different function is performed according to the state of the both ends 210*a*, 210*b* at the time of an incoming call event will be described below in detail with reference to FIG. 4.

On the other hand, the controller 180 may control a function of the earset 100 currently being executed according to the state of the two both ends 210*a*, 210*b*. For example, when a function performed in the earset 100 is a call function, the controller 180 may control the call function according to a change of the state of the both ends 210*a*, 210*b*. Alternatively, when a function performed by the earset 100 is a sound source playback function, the controller 180 may control a function related to the sound source playback according to the state of the both ends 210*a*, 210*b*. Hereinafter, an example in which a call function is controlled when a function being executed in the earset 100 is the call function will be described with reference to FIGS. 6 and 7, and an example in which a sound source playback function is controlled according to the state of the both ends 210a, 210b when a function being executed in the earset 100 is the sound source playback function will be described in more detail with reference to FIGS. 8 through 10.

In addition, the controller 180 may switch the operation mode to an operation state for performing a specific function according to a result of detecting the state of the both ends 210a, 210b, or determine whether or not to execute a specific function executable in the earset 100. For example, the controller 180 may allow a function associated with a specific peripheral device or a specific function of the earset 100 to be executed or the function to be terminated according to the state of the both ends 210a, 210b. An example in which a specific function is turned on or off or whether or not switch to a specific operation state is determined according to a result of detecting the state of the both ends 210a, 210b as described above will be described below in more detail with reference to FIGS. 11A, 11B, and 12.

First, FIG. 4 is a flowchart illustrating an operation flow when a call is received at the earset 100 associated with the present disclosure.

Referring to FIG. 4, the controller 180 of the earset 100 according to an embodiment of the present disclosure may detect whether or not a call is incoming. In this case, the controller 180 may notify the occurrence of the event through a vibration output through the haptic module 152 or through a predetermined audio signal output through the audio output unit 151. Furthermore, the controller 180 may detect whether or not the attachment or detachment state of the both ends 210a, 210b has been changed (S400), and allow the earset 110 to operate in a mode for providing a corresponding call function.

For example, when the both ends 210a, 210b of the earset 100 are separated from each other by more than a predetermined distance, that is, in a detached state, the earset 100 may operate in an earphone mode in which audio signals are output through the earphones 200a, 200b. On the contrary, when the both ends 210a, 210b of the earset 100 are attached to each other, the earset 100 may operate in a speaker mode in which sound signals are output through the speakers 220a, 220b.

As a result of detection in the step S400 in this state, when the state of both ends 210a, 210b is not changed within a preset period of time or when there is a preset user's input (for example, when a call key is selected or either one of the earphones 200a, 200b is worn, etc.), the controller 180 may provide a call function according to the current operation state of the earset 100 (S402). In other words, when the earset 100 is currently in an earphone mode, the controller 180 may provide a function of outputting a voice signal of the other party according to the incoming call through the earphones 200a, 200b in the step S402. On the contrary, when the earset 100 is currently in a speaker mode, the controller 180 may provide a function of outputting a voice signal of the other party according to the incoming call through the speakers 220a, 220b in the step S402.

On the other hand, when it is determined in the step S400 that the state of the both ends 210a, 210b has been changed, the controller 180 may provide another function related to the currently received call. Furthermore, another function associated with the incoming call may be a call hold function for the currently received call.

In other words, when the attachment or detachment state of the both ends 210a, 210b is changed within a predetermined period of time after an incoming call event occurs, the controller 180 may put call connection on hold (call hold) according to the incoming call (S406). In this case, the controller 180 may transmit a voice message for notifying the other party of the call that the call has been put on hold, and store information on the call put on hold. In this case, the stored call hold information may be displayed through the earphones 200a, 200b or the speakers 220a, 220b, or through connectable peripheral devices.

Meanwhile, in the above description, a case where the call hold function is provided according to a change of the attachment or detachment state of the both ends 210a, 210b has been described as an example, but a call function may be provided according to a change of the attachment or detachment state of the both ends 210a, 210b.

In this case, when the attachment or detachment state of the both ends 210a, 210b is not changed within a preset period of time, the controller 180 may allow a call hold function or a current call that is not being connected to be transmitted automatically to the other party of the received call. On the contrary, when the attachment or detachment state of the both ends 210a, 210b is changed within a preset period of time as a result of the detection in the step S400, the controller 180 may determine it as a user's input for call connection to the received call. Accordingly, when there is a change of the attachment or detachment of the both ends 210a, 210b, the controller 180 may provide a call function according to the current operation mode of the earset 100, namely, the earphone phone function or the speaker phone function.

Meanwhile, the controller 180 may provide not only a call hold function but also another function according to a change of the attachment or detachment state of the both ends 210a, 210b. For example, the function may be a function for switching the current operation mode of the earset 100. In this case, the controller 180 may use sensing values of various sensors provided in the sensing unit 140 in order to allow the user to select a function different from the call hold function.

For an example, when the attachment or detachment state of the both ends 210a, 210b is changed in the step S400, the controller 180 may detect whether or not the user has installed the earphones 200a, 200b. The earphones 200a, 200b may include sensors such as a proximity sensor or a touch sensor, thereby allowing the user to sense whether or not the earphones 200a, 200b are mounted. Furthermore, the controller 180 may determine the operation mode of the earset 100 and a call function provided by the earset 100 according to whether or not the user wears the earphones 200a, 200b (S408).

In other words, when a call is received in a state where the earset 100 is currently operated in a speaker mode in which audio signals are output through the speakers 220a, 220b (i.e., the earphones 200a, 200b are not worn), when the attachment or detachment state of the both ends 210a, 210b is changed as a result of the detection in the step S402, the controller 180 may determine it as selecting a function related to the call incoming. Furthermore, when it is determined in the step S404 that the earphones 200a, 200b are worn on the user's ear, the controller 180 may recognize the wearing of the earphones 200a, 200b as an input for switching to an earphone mode. Accordingly, the controller 180 may switch the operation mode of the earset 100 to an earphone mode in the step S408 to output a voice signal of the other party of the received call through the earphones 200a, 200b.

On the contrary, when a call is received in a state where the earset 100 is currently operated in an earphone mode in which audio signals are output through the earphones 200a, 200b (i.e., the earphones 220a, 220b are worn), when the attachment or detachment state of the both ends 210a, 210b is changed as a result of the detection in the step S402, the controller 180 may determine it as selecting a function related to the call incoming. Furthermore, when it is determined in the step S404 that the earphones 200a, 200b are taken off or detached, the controller 180 may recognize the attachment or detachment of the earphones 200a, 200b as an input for switching to a speaker mode. Accordingly, the controller 180 may switch the operation mode of the earset 100 to a speaker mode in the step S408 to output a voice signal of the other party of the received call through the speakers 220a, 220b.

On the other hand, the switching of the operation mode of the earset 100 may be carried out while the call function is being provided. Accordingly, the controller 180 may detect whether the attachment or detachment state of the earphones 200a, 200b has been changed, and accordingly, provide the switching of the operation mode of the earset 100 and a call function according to the switched operation mode.

Hereinafter, FIGS. 5 to 8 are exemplary views illustrating examples in which a call function is provided when a call is received at the earset 100 according to an embodiment of the present disclosure.

First, referring to FIG. 5, FIG. 5 illustrates an example in which a call is received while the earset 100 according to an embodiment of the present disclosure operates in an earphone mode.

As illustrated in the first drawing of FIG. 5, when both ends 210a, 210b are separated from each other in a detached state, the earset 100 according to an embodiment of the present disclosure may operate in an earphone mode in which audio signals are output through the earphones 200a, 200b. When a call is received in this state, the controller 180 may output a voice signal of the other party of the received call through the earphones 200a, 200b. The second drawing of FIG. 5 illustrates such an example.

Meanwhile, the controller 180 of the earset 100 according to an embodiment of the present disclosure provide various functions related to a currently occurred event, that is, an incoming call, according to a change of the attachment or detachment state of the both ends 210a, 210b while operating in an earphone mode (in a state illustrated in the first drawing of FIG. 5). For example, as illustrated in the third drawing of FIG. 5, when the both ends 210a, 210b are attached to each other, the controller 180 may determine that the attachment or detachment state of the both ends 210a, 210b has been changed, thereby providing a function related to the incoming call, namely, a call hold function.

In addition, when the user changes the wearing state of the earphones 200a, 200b while the attachment or detachment state of the both ends 210a, 210b is changed, the controller 180 may recognize it as an input for selecting another function associated with the incoming call. In other words, in a state where the both ends 210a, 210b are detached as illustrated in the first drawing of FIG. 5, when the both ends 210a, 210b are attached to each other as illustrated in the fourth drawing of FIG. 5, and then the earphones 200a, 200b are detached, the controller 180 may change the operation mode of the earset 100 to a speaker mode based on the state of the earset 100. Accordingly, the controller 180 may output a voice signal of the other party of the received call through the speakers 220a, 220b (the execution of a speaker phone function).

Figure 6:
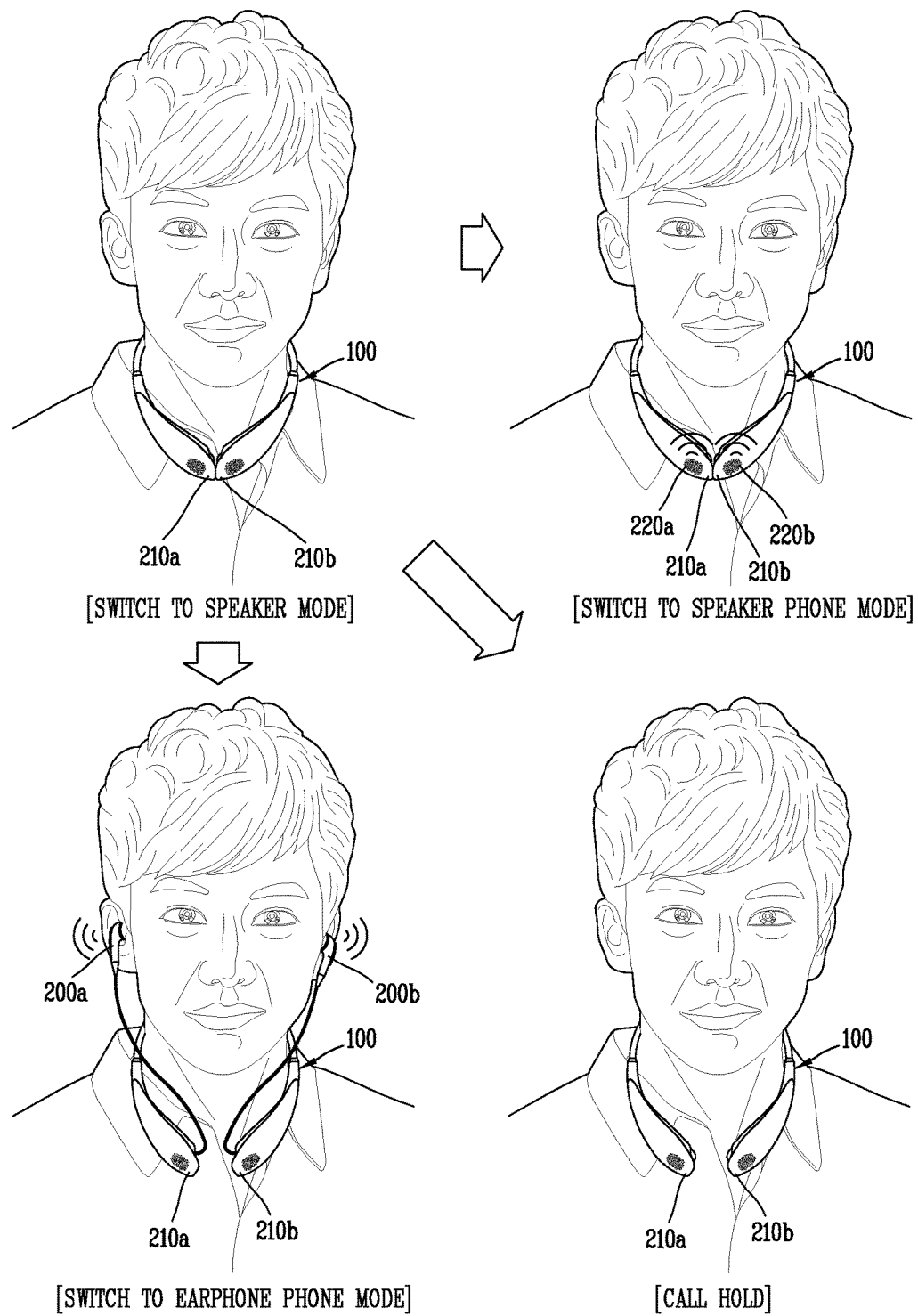
FIG. 6 is an exemplary view illustrating an example in which a call is received when an earset associated with the present disclosure is in a speaker mode.

On the other hand, FIG. 6 illustrates an example in which a call is received in a state where the earset 100 according to an embodiment of the present disclosure operates in a speaker mode.

As illustrated in the first drawing of FIG. 6, when the both ends 210a, 210b are attached to each other, the earset 100 according to an embodiment of the present disclosure may operate in a speaker mode in which audio signals are output through the speakers 220a, 220b. When a call is received in this state, the controller 180 may output a voice signal of the other party of the received call through the speakers 220a, 220b. The second drawing of FIG. 6 illustrates such an example.

Meanwhile, the controller 180 of the earset 100 according to an embodiment of the present disclosure provide various functions related to a currently occurred event, that is, an incoming call, according to a change of the attachment or detachment state of the both ends 210a, 210b while operating in a speaker mode (a state illustrated in the first drawing of FIG. 6). For example, as illustrated in the third drawing of FIG. 6, when the both ends 210a, 210b are separated and detached from each other, the controller 180 may determine that the attachment or detachment state of the both ends 210a, 210b has been changed, thereby providing a function related to the incoming call, namely, a call hold function.

In addition, when the user changes the wearing state of the earphones 200a, 200b while the attachment or detachment state of the both ends 210a, 210b is changed, the controller 180 may recognize it as an input for selecting another function associated with the incoming call. In other words, as illustrated in the fourth drawing of FIG. 6, when the both ends 210a, 210b are detached and the earphones 200a, 200b are attached, the controller 180 may change the operation mode of the earset 100 to an earphone mode based thereon. Accordingly, the controller 180 may output a voice signal of the other party of the received call through the earphones 200a, 200b (the execution of an earphone phone function).

Meanwhile, when the state of the both ends 210a, 210b is changed in a state where a call function is executed, the earset 100 according to an embodiment of the present disclosure may control the currently provided function, namely, the call function according to the changed state. For example, the controller 180 may of course terminate the currently connected call based on a change of the attachment or detachment state of the both ends 210a, 210b. FIGS. 7 through 8 illustrate an example of such a case.

According to the foregoing description, the earset 100 according to an embodiment of the present disclosure may operate in an earphone mode when the both ends 210a, 210b are in a detached state. In this case, as illustrated in the first drawing of FIG. 7, the earset 100 may output a voice signal according to an incoming call through the earphones 200a, 200b (earphone phone function).

Furthermore, in a state where the call function is provided as described above, the controller 180 may terminate the call function according to whether or not the state of the both ends 210a, 210b of the earset 100 is changed. In other words, as illustrated in the second drawing of FIG. 7, when the both ends 210a, 210b of the earset 100 are attached to each other, the controller 180 may determine that the state of the both ends 210a, 210b has been changed. Then, the function currently being executed, namely, the call function, may be terminated.

On the other hand, the controller 180 may of course switch the operation mode of the earset 100 at any time according to the user's selection even through the call function is being provided. In other words, as illustrated in the first drawing of FIG. 7, when the wearing state of the earphones 200a, 200b is only changed, namely, the earphone 200a, 200b are taken off without changing the state of the both ends 210*a*, 210*b* while a voice signal received through the earphones 200*a*, 200*b* is being output, the controller 180 may switch the operation mode of the earset 100 based on the state of the earset 100.

In other words, the controller 180 may switch the operation mode of the earset 100 to a speaker mode, and output the voice signal received through the speakers 220*a*, 220*b*. It is because, in the earphone mode, when the user releases the earphones 200*a*, 200*b* without terminating the call, it can be determined that the user intends to switch the earphones 200*a*, 200*b* to the speaker mode. The third drawing of FIG. 7 illustrates such an example.

On the contrary, according to the foregoing description, the earset 100 according to an embodiment of the present disclosure may operate in a speaker mode when the both ends 210*a*, 210*b* are in an attached state. In this case, as illustrated in the first drawing of FIG. 8, the earset 100 may output a voice signal according to an incoming call through the speakers 220*a*, 220*b* (speaker phone function).

Furthermore, in a state where the call function is provided as described above, the controller 180 may terminate the call function according to whether or not the state of the both ends 210*a*, 210*b* of the earset 100 is changed. In other words, as illustrated in the second drawing of FIG. 7, when the both ends 210*a*, 210*b* of the earset 100 are detached from each other, the controller 180 may determine that the state of the both ends 210*a*, 210*b* has been changed. Then, the function currently being executed, namely, the call function, may be terminated.

On the other hand, the controller 180 may of course change the operation mode of the earset 100 based on the wearing state of the earphones 200*a*, 200*b* similarly to the case illustrated in FIG. 7. In other words, when the earphones 200*a*, 200*b* are worn without changing the state of the both ends 210*a*, 210*b* while a voice signal received through the speakers 220*a*, 220*b* is output, the controller 180 may of course switch the operation mode of the earset 100 from the speaker mode to the earphone mode based thereon. It is because, in the speaker mode, when the user wears the earphones 200*a*, 200*b* without terminating the call, it can be determined that the user intends to switch a call mode to the speaker mode. The third drawing of FIG. 8 illustrates such an example.

On the other hand, in the foregoing description, when a call function is provided in the earset 100 according to an embodiment of the present disclosure, an example in which a function related to the call is provided or controlled according to the state of the both ends 210*a*, 210*b*. However, the earset 100 according to an embodiment of the present disclosure may of course control the function being executed or provide another related function depending on the state of the both ends 210*a*, 210*b*, even when another function is provided at any time.

In the following description, a sound source playback function for playing sound source data as an audio signal as another function that can be provided from the earset 100 according to an embodiment of the present disclosure will be described as an example.

Figure 9:
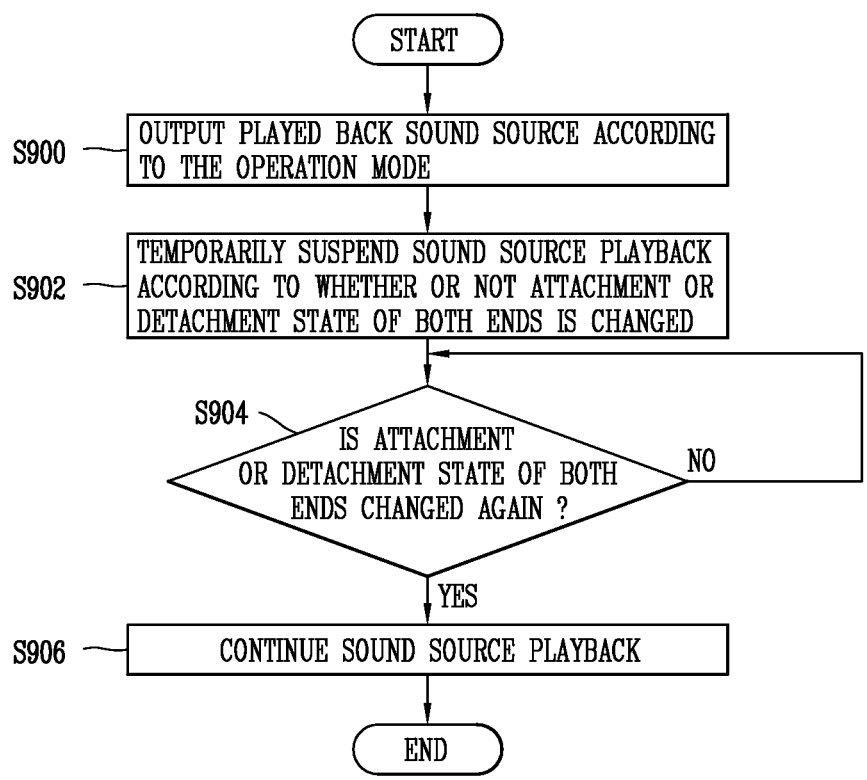
FIG. 9 is a flowchart illustrating an operation flow when a sound source playback function is performed in an earset associated with the present disclosure.

First, FIG. 9 is a flowchart illustrating an operation flow when the sound source playback function is executed in the earset 100 associated with the present disclosure.

According to the foregoing description, the controller 180 of the earset 100 according to an embodiment of the present disclosure may operate in an earphone mode or a speaker mode according to the state of the both ends 210*a*, 210*b* of the earset 100. Accordingly, when the sound source playback function is executed, the controller 180 may output an audio signal reproduced from pre-stored sound source data or sound source data received from a preset external server (for example, a broadcast server) to the earphones 200*a*, 200*b* or the speakers 220*a*, 220*b* (S900).

In this case, the controller 180 may control a currently executing function, that is, a sound source playback function, depending on whether or not the state of the both ends 210*a*, 210*b* is changed. For example, when the state of the both ends 210*a*, 210*b* is changed, the controller 180 may stop the playback of the sound source (S902). When the earset 100 operates in a speaker mode, a change of the state of the both ends 210*a*, 210*b* in the step S902 may be a case where the both ends 210*a*, 210*b* are attached to each other at the time of sensing the detachment of the both ends 210*a*, 210*b* when the earset operates in an earphone mode. In other words, the controller 180 may stop the playback of a sound source only by the user's operation of changing the state of the both ends 210*a*, 210*b* of the earset 100.

In this state, the controller 180 may detect whether or not the state of the both ends 210*a*, 210*b* of the earset 100 has been changed again (S904). Furthermore, in accordance with the detection result of the step S906, the playback of the currently stopped sound source may be continued (S906).

On the other hand, the controller 180 may of course switch the operation mode of the earset 100 according to the user's selection when the sound source playback function is provided. For example, the controller 180 may of course switch the operation mode to an earphone mode or a speaker mode depending on whether or not the user wears the earphone 200*a*, 200*b*, similar to the call function.

In other words, when the user releases the wearing of the earphones 200*a*, 200*b* while operating in an earphone mode, the controller 180 may consider it as the user's intention desired to switch the operation mode to a speaker mode. Then, the operation mode is switched to the speaker mode to output an audio signal corresponding to the sound source playback through the speakers 220*a*, 220*b*. On the contrary, when the user wears the earphones 200*a*, 200*b* while the earset 100 operates in a speaker mode, the controller 180 switches the operation mode to an earphone mode to allow an audio signal according to the playback of the sound source through the earphone 200*a*, 200*b*.

Meanwhile, the controller 180 may use the wear detection result of the earphones 200*a*, 200*b* in more various ways. For example, when the wearing state of either one of the earphones 200*a*, 200*b* is changed, the controller 180 may control a currently executing function, that is, a sound source playback function according to the changed wearing state.

For example, when the user wears only either one of the earphones 200*a*, 200*b* or releases the wearing, the controller 180 may control another sound source to be played back (fast forward) or the played back sound source to be played back again (rewind) based on the behavior of the user. In this case, the controller 180 may of course control the sound source playback function in consideration of a number of times the wearing state of either one of the earphones 200*a*, 200*b* is changed within a predetermined period of time, a time when the wearing state is changed or the like.

Figure 10:
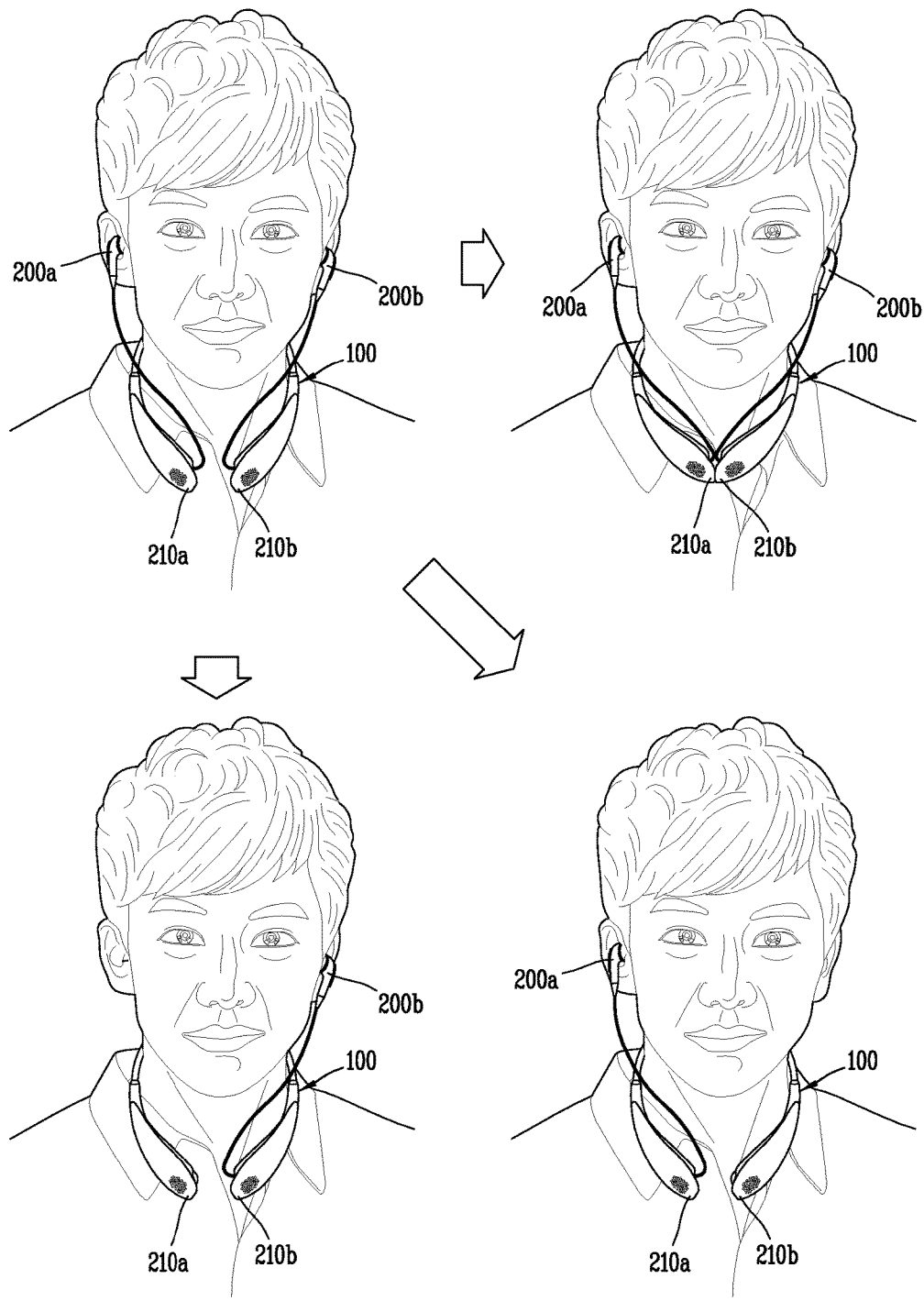
FIG. 10 is an exemplary view illustrating an example in which a sound source playback function is performed in an earset associated with the present disclosure.

FIG. 10 illustrates an example in which a sound source playback function is performed in the earset 100 associated with the present disclosure as described above.

Referring to FIG. 10, the first drawing of FIG. 10 illustrates an example in which the sound source playback function is carried out while the earset 100 operates in an earphone mode. In this state, if the user changes only the attachment or detachment state of both ends 210*a*, 210*b* of the earset 100 without changing the wearing state of the earphones 200a, 200b as illustrated in the second drawing of FIG. 10, the controller 180 may stop playback of the sound source based thereon.

On the other hand, as illustrated in the second drawing of FIG. 10, if the user releases the wearing state of either one earphone (second earphone 200b), the controller 180 may control the second earphone 200b to fast forward at least one sound source based on a time of releasing the wearing of the second earphone 200b or a number of times the wearing state of the second earphone 200b is released for a preset period of time.

Moreover, as illustrated in the fourth drawing of FIG. 10, when the user releases the wearing state of the other earphone (first earphone 200a), the controller 180 may control the second earphone 200b to rewind at least one sound source based on a time of releasing the wearing of the first earphone 200a or a number of times the wearing state of the first earphone 200a is released for a preset period of time.

On the other hand, examples illustrated above in FIG. 10 assume a case where the earset 100 operates in an earphone mode. Accordingly, when the earset 100 operates in a speaker mode, the state of the earset 100 for controlling the function of the earset 100 may of course be different from that illustrated above in FIG. 10. In other words, unlike the second drawing of FIG. 10, the controller 180 may stop the playback of a sound source when the both ends 210a, 210b are separated and detached from each other. In addition, when the first earphone 200a or the second earphone 200b is worn, other than when the wearing of the first earphone 200a or the second earphone 200b is released, the controller 180 may control the first earphone 200a or the second earphone 200b to fast forward or rewind at least one sound source based on a time of wearing the first earphone 200a or a number of times the first earphone 200a or the second earphone 200b is worn for a preset period of time.

Figure 11B:
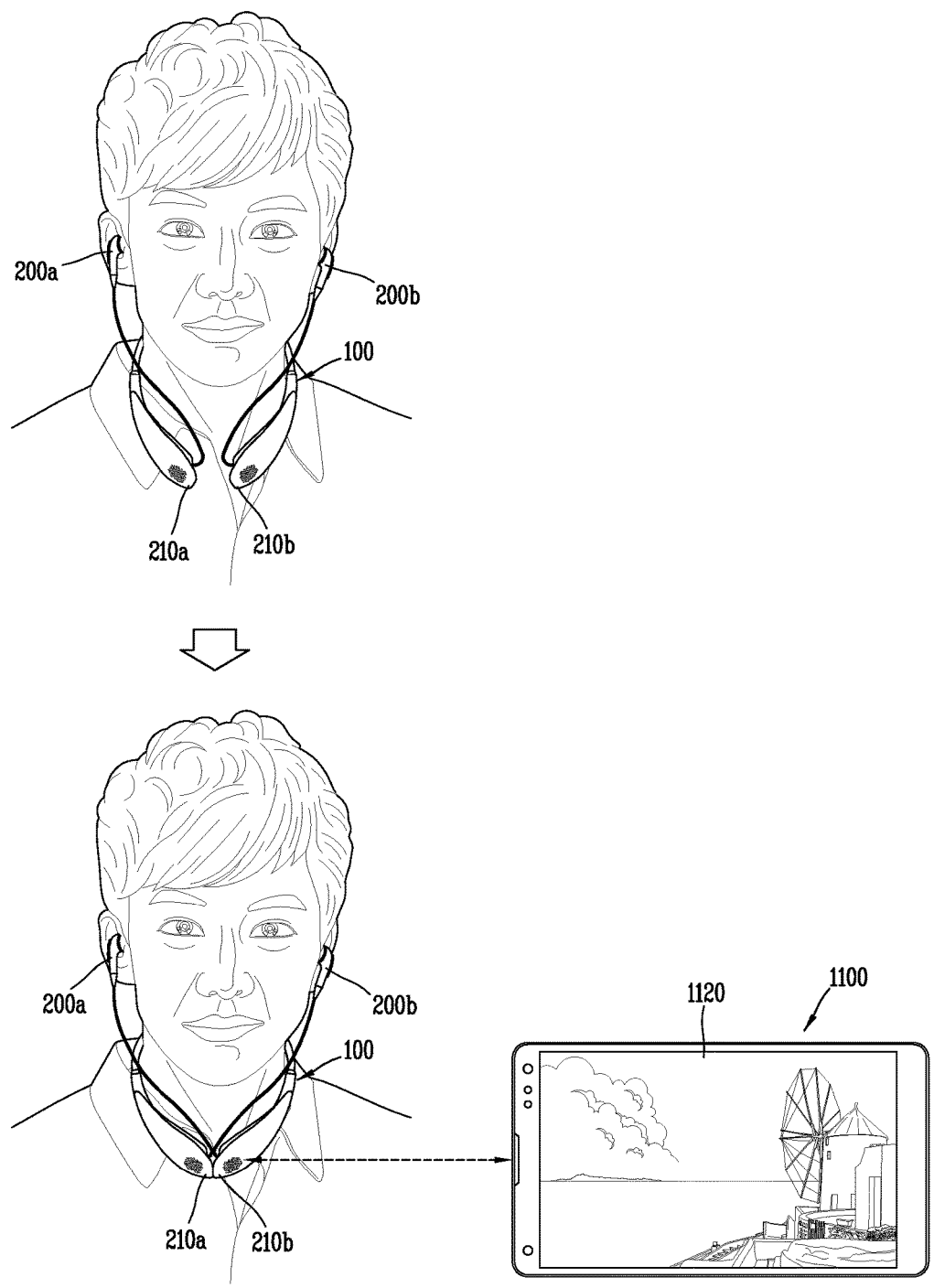

Meanwhile, according to the foregoing description, it has been described that the controller 180 may determine whether or not to execute a function associated with a specific peripheral device according to the state of the both ends 210a, 210b of the earset 100. FIGS. 11A and 11B illustrate examples of such cases.

First, referring to FIG. 11A, the first drawing of FIG. 11A illustrates an example of providing a call function in an earphone mode in the earset 100 according to an embodiment of the present disclosure. Furthermore, when the attachment or detachment state of the both ends 210a, 210b of the earset 100 is changed in a state as illustrated in the first drawing of FIG. 11A, the controller 180 may detect whether or not there is a connectable peripheral device, and a function associated with the connectable peripheral device may be provided according to the detection result.

Here, the peripheral device may have been connected to the earset 100 or may be pre-registered. Alternatively, the earset 100 may be connected through the peripheral device. In addition, the peripheral device may also be a device in a specific operation state. In other words, when the attachment or detachment state of the both ends 210a, 210b is changed, the earset 100 may detect connectable peripheral devices, and may be connected to a peripheral device operating in a preset operation state among the detected peripheral devices. Accordingly, even when there are a plurality of connectable devices around the earset 100, any one specific device may be selectively connected thereto. Furthermore, when the earset 100 is connected to the selected peripheral device, a preset function associated with the earset 100 may be immediately executed.

On the other hand, such a peripheral device may be a smart phone or a tablet PC, or a device such as a TV or a computer. In addition, functions that can be linked according to the connectable peripheral device may be different from each other. For example, when the connectable peripheral device is a smart phone 1100, the controller 180 may provide a video call function using an image input device, i.e., the camera, provided in the smart phone 1100.

Meanwhile, the smart phone 1100 may be in a state of entering a specific operation state. In other words, the smart phone 1100 connected to the earset 100 may be in a state where a phone function has been executed. Here, the state where a phone function has been executed may include a waiting state for receiving a phone number input for incoming call. Furthermore, as illustrated in the second drawing of FIG. 11A, when the earset 100 is connected in an operating state where a specific function such as a phone function is executed, a video call function using the image input device and the display unit of the smart phone 1100 may be provided.

Thus, as illustrated in the second drawing of FIG. 11A, when the state of the both ends 210a, 210b of the earset 100 is changed, the smart phone 1100 may immediately execute a linkage function with the earset 100, namely, a video call function. Accordingly, at least one of an image 1110 of the communication partner and an image 1112 of the user transmitted to the other party of the call may be displayed on the display unit of the smart phone 1100.

On the other hand, the state of being connected to peripheral devices may of course be released in the reverse order of the above-described process. In other words, when the attachment or detachment state of the both ends 210a, 210b of the earset 100 is changed again in a state as illustrated in the second drawing of FIG. 11A, the controller 180 may detect it as the user's input for releasing the connection to the peripheral device. Then, the controller 180 may release the connection to the currently connected peripheral device to terminate the video call function provided through the smart phone 1100.

On the other hand, even when the video call function is terminated, the currently connected call may not be terminated. Accordingly, when the video call function is terminated, the controller 180 may provide a call function in the earphone mode of the earset 100 as illustrated in the first drawing of FIG. 11A.

On the other hand, the earset 100 according to an embodiment of the present disclosure may be provided with a different linkage function depending on the type of the peripheral device or a function executed in the earset 100. For example, when a peripheral device is connected while the sound source playback function is being executed, the earset 100 according to an embodiment of the present disclosure may provide a function currently being executed in the earset 100, namely, a linkage function with the peripheral device associated with the sound source playback function. FIG. 11B illustrates an example of such a case.

Referring to FIG. 11B, first, the first drawing of FIG. 11B illustrates an example of a case where a sound source playback function is carried out in the earset 100 according to an embodiment of the present disclosure. Furthermore, in this state, when the state of the both ends 210a, 210b of the earset 100 is changed, the controller 180 may detect a connectable peripheral device, and connect the earset 100 to the detected at least one peripheral device.

Here, the peripheral device may be a device in a specific operation state. Furthermore, the specific operation state may be an operation state that performs a function related to a function currently being executed in the earset 100. In other words, as illustrated above in FIG. 11A, when a call function is being executed in the earset 100, the controller 180 may detect whether or not there is a pre-registered peripheral device in a state where the call function has been executed among connectable peripheral devices. Likewise, when the earset 100 is in a state of playing back the sound source, the controller 180 may detect whether or not there is a peripheral device in an operation state capable of playing back multimedia data.

Furthermore, when a peripheral device in an operating state capable of playing back multimedia data is detected, the controller 180 may connect the earset 100 with the detected peripheral device in response to a state change of the both ends 210a, 210b. In this case, a function currently executed in the earset 100, that is, a linkage function related to the sound source playback function, may be executed on the detected peripheral device. An example of such a linkage function may include a function of playing back video data related to a sound source played back on the earset 100, and the second drawing of FIG. 11B illustrates an example in which a music video 1152 of a sound source played back on the earset 100 and the second is played back through a peripheral device 1150 connected to the earset 100. Here, the played back video data may be stored in advance in the peripheral device 1150 or may be received from a preset server (for example, a broadcast server).

Meanwhile, even when video data played back in the peripheral device 1150 is not finished, the controller 180 may of course disconnect the currently connected peripheral device 1150 according to the user's selection. In this case, the disconnection from the peripheral device 1150 may not of course affect a function executed in the earset 100, that is, the sound source playback function at all. Therefore, when the connection to the peripheral device 1150 is released, that is, when the state of the both ends 210a, 210b of the earset 100 is changed, only images played back by the peripheral device 1150 is terminated, but the state in which the sound source is played back may be continuously maintained.

On the other hand, referring to FIGS. 11A and 11B, it is described an example in which only one peripheral device is connected to the earset 100. However, a plurality of peripheral devices may of course be connected to the earset 100. In this case, depending on the number and type of the connected peripheral devices, linkage functions provided from the peripheral devices connected to the earset 100 may be different from each other.

On the other hand, according to the foregoing description, it has been described that the earset 100 according to an embodiment of the present disclosure may include the optical output unit 153 to provide a lighting function using light emitted from the optical output unit 153. In this case, the controller 180 may of course provide the lighting function based on the state of the both ends 210a, 210b of the earset 100.

Figure 12:
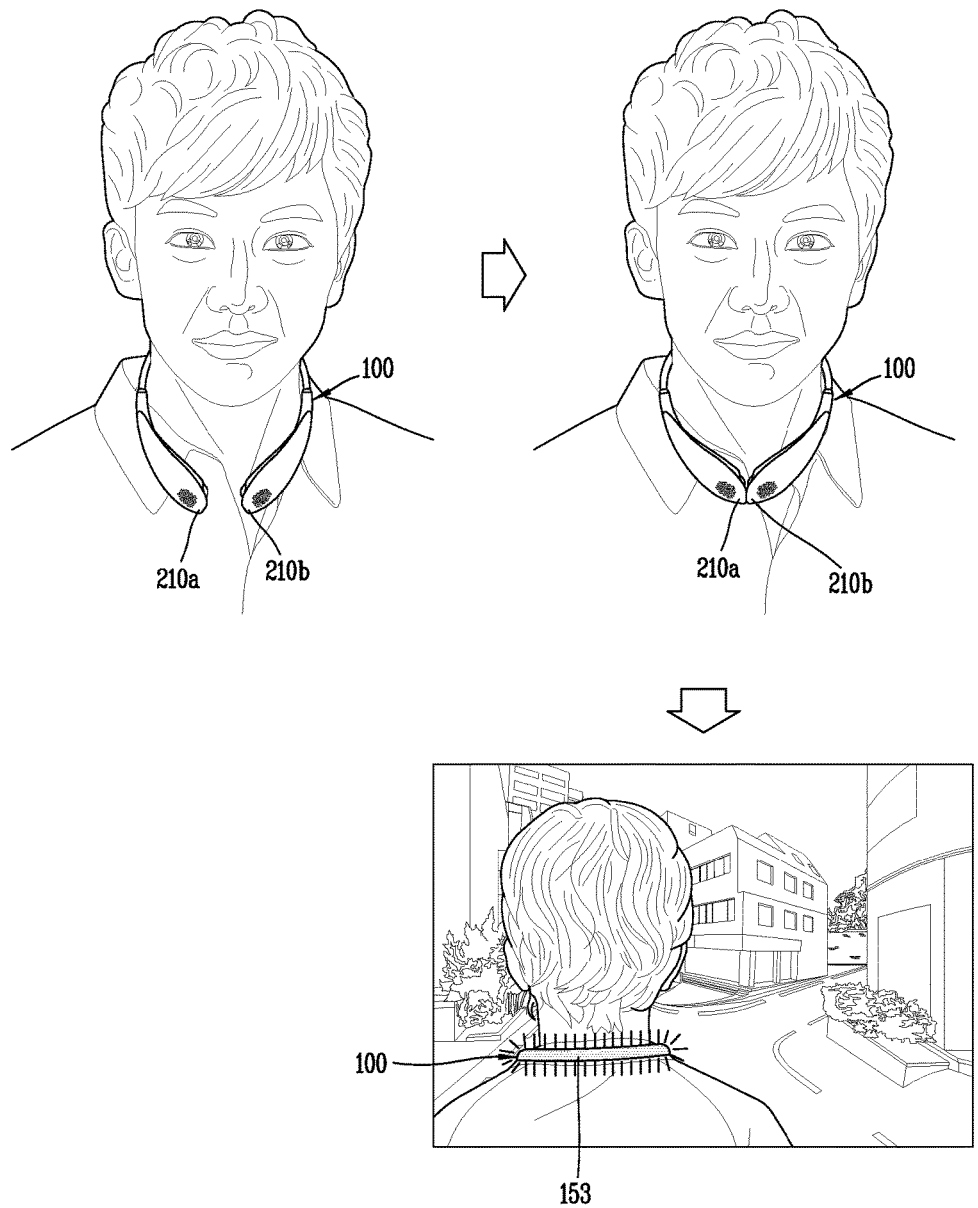
FIG. 12 is an exemplary view illustrating an example of a lighting function operating in an earset associated with the present disclosure.

FIG. 12 illustrates an example in which a lighting function is provided in the earset 100 according to an embodiment of the present disclosure.

Referring to FIG. 12, the first drawing of FIG. 12 illustrates a state in which the both ends 210a, 210b of the earset 100 are detached from each other, and illustrates an example in which a lighting function is not provided. In this state, the controller 180 may detect whether or not the state of the both ends 210a, 210b of the earset 100 has been changed, and the optical output unit 153 may emit light according to the detection result.

In other words, as illustrated in the first drawing of FIG. 12, when the lighting function is turned off in a state where the both ends 210a, 210b of the earset 100 are separated and detached from each other, the lighting function may be turned on when the both ends 210a, 210b are in a state where they are attached to each other as illustrated in the second drawing of FIG. 12. Accordingly, as illustrated in the third drawing of FIG. 12, light may be emitted from the optical output unit 153. Thus, as illustrated in the third diagram of FIG. 12, a vehicle or person approaching from behind the user may more easily identify the user.

On the other hand, in FIG. 12, a case where the both ends 210a, 210b of the earset 100 are detached from each other when the lighting mode is in an off state has been described as an example, but on the contrary, the lighting function may of course be in an off state when the both ends 210a and 210b of the earset 100 are attached to each other. In this case, the controller 180 may allow the optical output unit 153 to emit light (turn on the lighting function) when the both ends 210a, 210b are detached from each other.

On the other hand, the lighting function may be turned on or off depending on whether or not a preset condition is satisfied. For example, the lighting function may be automatically turned on when the illuminance around the earset 100 is less than a preset level as a result of sensing the illumination sensor 142. Alternatively, the lighting function may be automatically turned on when the current time is subsequent to a preset time, i.e., in the evening or at night, based on the current time. Alternatively, the lighting function may automatically turn based on at least one of the detection result of the illuminance sensor and the visual measurement result only when the earset 100 is located outdoors in further consideration of the current location of the earset 100.

On the other hand, when the lighting function is turned on as described above, the state of the both ends 210a, 210b of the earset 100 at that time may correspond to an on state of the lighting function. Therefore, the controller 180 may turn off the lighting function when the detachment state of the both ends 210a, 210b of the earset 100 is changed while the lighting function is turned on.

On the other hand, a condition that the lighting function is turned on or off, an intensity of light emitted from the optical output unit 153, and the like, may be set by various methods. For example, a user may set a condition in which the lighting function is turned on or off using a peripheral device connectable to the earset 100, that is, a device such as a smart phone. Alternatively, a smart phone connected to the earset 100 may be used to determine the intensity of light emitted from the optical output unit 153, the color of the light, the blinking or non-blinking of the light, and the like.

Meanwhile, the controller 180 may of course be configured to cause light emitted from the optical output unit 153 to be different according to various situations. For example, the controller 180 may determine whether or not the user is walking or running based on the measurement values of the sensors included in the sensing unit 140. In addition, based on the determined user's situation, at least one of the intensity, the color, and the blinking period may be different from each other.

On the other hand, the controller 180 may control the lighting function depending on whether or not it is connected to a preset peripheral device. For example, when a preset cradle is connected to the earset 100, the controller 180 may output an optical signal having a preset intensity or color through the optical output unit 153 of the earset 100. In this case, the controller 180 of the earset 100 may receive a signal for controlling light emitted from the optical output unit 153 from a key provided on the cradle, and thus the earset 100 may also be used as lighting when connected to a preset cradle.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the earset. Accordingly, the foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An earset, comprising:
    an earset body including both ends formed to be detachable from or attachable to each other;
    an audio output unit including a plurality of earphones and at least one speaker for outputting an audio signal;
    a sensing unit configured to sense a change of an attachment or detachment state at the both ends; and
    a controller configured to:
        operate the earset in either one of a first operation mode for outputting an audio signal through the plurality of earphones and a second operation mode for outputting an audio signal through the at least one speaker;
        turn on a function to be executed in the earset, turn off a function being executed in the earset or execute any one of functions corresponding to an event detected by the earset based on whether the attachment or detachment state of the both ends is changed while the earset is operated in the first operation mode or second operation mode; and
        control an operation mode of the earset to operate in either one of the first operation mode and the second operation mode based on the attachment or detachment state of the both ends.

2. The earset of claim 1, wherein the sensing unit further detects whether the earphones are attached or detached, and
    the controller switches the operation mode of the earset to another operation mode based on whether the attachment or detachment state of the both ends is changed and the detachment state of the earphones.

3. The earset of claim 1, wherein the earset further comprises:
    a wireless communication unit configured to receive a wireless signal,
    wherein when a call received through the wireless communication unit is sensed, the controller controls any one of functions related to the detected incoming call to be executed based on whether the attachment or detachment state of the both ends is changed, and
    the function related to the detected incoming call is one of a function of connecting a call according to the received call or a function of holding a call according to the received call.

4. The earset of claim 3, wherein when the call is on hold, the controller transmits a guide message corresponding to call hold to the other party of the received call.

5. The earset of claim 3, wherein when the call is connected, the controller outputs an audio signal received from the other party of the received call through the plurality of earphones or speakers according to a current operation mode of the earset, and controls a function related to the connected call according to whether the attachment or detachment state of the both ends is changed, and
    the function related to the connected call comprises a function of terminating the connected call.

6. The earset of claim 5, wherein the function related to the connected call further comprises a function of changing an output path of an audio signal received from the other party of the received call, and
    the controller changes the output path based on whether or not the attachment or detachment state of the both ends is changed and whether the earphones are attached or detached.

7. The earset of claim 1, wherein when a sound source playback function is executed, the controller outputs an audio signal according to the sound source playback through the plurality of earphones or speakers according to the attachment of detachment state of the both ends, and controls a function related to the sound source playback according to whether or not the attachment or detachment state of the both ends is changed, and
    the function related to the sound source playback comprises a function of temporarily suspending the sound source playback.

8. The earset of claim 7, wherein the function related to the sound source playback further comprises a function of changing an output path of an audio signal according to the sound source playback, and
    the controller changes the output path based on whether or not the attachment and detachment state of the both ends is changed and whether the earphone are attached or detached.

9. The earset of claim 7, wherein a function related to the sound source playback further comprises a function of fast forwarding and a function of rewinding the at least one music source, and
    the controller controls the fast forwarding or rewinding of at least one music source based on whether either one of the plurality of earphones is attached or detached.

10. The earset of claim 1, wherein the controller detects a peripheral device connectable to the earset when the attachment or detachment state of the both ends is changed, and controls a function associated with the connectable peripheral device to be executed in the earset and the peripheral device according to the detection result.

11. The earset of claim 10, wherein:
    the detected peripheral device is one of a plurality of devices connectable with the earset; and
    the detected peripheral device, which is connected to the earset or previously registered with the earset, is in an operating state related to a function being executed in the earset when the attachment or detachment state of the both ends is changed.

12. The earset of claim 10, wherein the peripheral device is a device including a video input/output device, and
    when the attachment or detachment state of the both ends is changed during an operation state in which the earset performs a call function, the controller outputs a video signal received from the other party of the call through the peripheral device, and transmits a user's video received through the peripheral device to the other party of the call.

13. The earset of claim 10, wherein the peripheral device is a device including a video output device, and
when the attachment or detachment state of the both ends is changed during an operation state in which the earset performs a function of playing back a sound source, the controller outputs video information related to a sound source played back in the earset through the peripheral device.

14. The earset of claim 1, wherein the earset further comprises an optical output unit that emits light of various light sources according to whether or not a preset condition is satisfied, and
the controller controls the optical output unit to be turned on or off according to whether the state of the both ends is changed or not.

15. The earset of claim 14, wherein the controller controls the light emission of the optical output unit according to whether or not the earset is connected to a preset peripheral device, and
the preset peripheral device comprises a preset cradle.

16. A control method of an earset comprising both ends formed to be detachable from or attachable to each other and an audio output unit including a plurality of earphones and at least one speaker for outputting an audio signal, the method comprising:
operating in a first operation mode for outputting an audio signal through the plurality of earphones or a second operation mode for outputting an audio signal through the at least one speaker according to an attachment or detachment state of the both ends;
detecting whether the attachment or detachment state of the both ends is changed while the earset is operated in the first operating mode or the second operating mode; and
turning on a function to be executed in the earset, turning off a function being executed in the earset, or executing any one of functions corresponding to an event detected by the earset or switching the operation mode of the earset based on the detected change of the attachment or detachment state of the both ends.

* * * * *